US012811674B2

(12) United States Patent
Qi et al.

(10) Patent No.: US 12,811,674 B2
(45) Date of Patent: Nov. 24, 2026

(54) METHODS FOR BROADCASTING AND RECEIVING SYSTEM INFORMATION, APPARATUS, DEVICE AND STORAGE MEDIUM

(71) Applicant: CHINA SATELLITE NETWORK INNOVATION CO., LTD, Beijing (CN)

(72) Inventors: Dongqing Qi, Beijing (CN); Ge Mang, Beijing (CN); Lu Zhang, Beijing (CN); Dongjun Ma, Beijing (CN)

(73) Assignee: CHINA SATELLITE NETWORK INNOVATION CO., LTD, Beijing (CN)

( * ) Notice: Subject to any disclaimer, the term of this patent is extended or adjusted under 35 U.S.C. 154(b) by 0 days.

(21) Appl. No.: 19/071,130

(22) Filed: Mar. 5, 2025

(65) Prior Publication Data

US 2025/0240090 A1 Jul. 24, 2025

Related U.S. Application Data

(63) Continuation of application No. PCT/CN2023/133438, filed on Nov. 22, 2023.

(51) Int. Cl.

| | |
|---|---|
| ***H04B 7/185*** | (2006.01) |
| ***H04W 24/08*** | (2009.01) |
| ***H04W 68/02*** | (2009.01) |

(52) U.S. Cl.

CPC ....... *H04B 7/1855* (2013.01); *H04B 7/18523* (2013.01); *H04W 24/08* (2013.01); *H04W 68/02* (2013.01)

(58) Field of Classification Search

None

See application file for complete search history.

(56) References Cited

U.S. PATENT DOCUMENTS 10,135,509 B1 * 11/2018 Marupaduga ....... H04W 52/322
2011/0065448 A1 3/2011 Song
(Continued)

FOREIGN PATENT DOCUMENTS

CN 105075366 A 11/2015
CN 111510961 A 8/2020
(Continued)

OTHER PUBLICATIONS

Translation of WO2023/108572 (Year: 2023).*
(Continued)

*Primary Examiner* — Faruk Hamza
*Assistant Examiner* — Cassandra L Decker
(74) *Attorney, Agent, or Firm* — Scully, Scott, Murphy & Presser, P.C.

(57) ABSTRACT

A methods for broadcasting and receiving system information, an apparatus, a device and a storage medium are provided. The method includes: determining, by a base station on a satellite, an edge beam footprint corresponding to a first cell; broadcasting system information associated with one or more neighbor cells of the first cell and system information associated with the first cell to the edge beam footprint in a process of broadcasting system information to the ground coverage region through a satellite beam; and after moving from a non-edge beam footprint to the edge beam footprint, receiving, by a user equipment, the system information associated with the one or more neighbor cells at the edge beam footprint.

14 Claims, 5 Drawing Sheets

(56) References Cited

U.S. PATENT DOCUMENTS

| | | | | |
|---|---|---|---|---|
| 2015/0117323 | A1* | 4/2015 | Hiben | H04L 12/189 370/329 |
| 2021/0306869 | A1 | 9/2021 | Wei | |
| 2022/0030532 | A1 | 1/2022 | Hajir | |
| 2022/0060959 | A1 | 2/2022 | Atungsiri | |
| 2023/0239830 | A1* | 7/2023 | Hong | H04B 7/1851 455/12.1 |
| 2023/0308957 | A1* | 9/2023 | Gao | H04W 16/10 |
| 2024/0063894 | A1* | 2/2024 | Vogedes | H04B 7/18541 |
| 2024/0064858 | A1* | 2/2024 | Niu | H04W 76/28 |
| 2024/0284333 | A1* | 8/2024 | Yavuz | H04W 52/0216 |
| 2024/0323794 | A1* | 9/2024 | Inakollu | H04W 36/32 |
| 2025/0056385 | A1* | 2/2025 | Medeiros De Amorim | H04W 48/10 |
| 2025/0253934 | A1* | 8/2025 | Zhao | H04B 7/18513 |
| 2025/0358809 | A1* | 11/2025 | Zhou | H04W 72/115 |

FOREIGN PATENT DOCUMENTS

| | | | | |
|---|---|---|---|---|
| CN | 112567814 | A | 3/2021 | |
| CN | 110493833 | B * | 4/2021 | H04W 36/08 |
| CN | 115968044 | A | 4/2023 | |
| JP | 2016-514924 | A | 5/2016 | |
| KR | 20170007433 | A | 1/2017 | |
| KR | 20220149305 | A | 11/2022 | |
| KR | 20230151912 | A | 11/2023 | |
| WO | 2021/018645 | A1 | 2/2021 | |
| WO | WO-2022155972 | A1 * | 7/2022 | H04W 36/083 |
| WO | 2023/069508 | A1 | 4/2023 | |
| WO | WO-2023108572 | A1 * | 6/2023 | H04W 24/08 |
| WO | 2023/178206 | A2 | 9/2023 | |
| WO | 2023/178206 | A3 | 9/2023 | |
| WO | WO-2024082936 | A1 * | 4/2024 | H04B 7/18521 |

OTHER PUBLICATIONS

Translation of WO2024/082936 (Year: 2023).*

Translation of WO2022/155972 (Year: 2022).*

The International Search Report of the counterpart PCT application No. PCT/CN2023/133438 issued on Aug. 6, 2024.

The Written Decision on Registration of counterpart KR application No. 10-2025-7007665 was issued on Jul. 16, 2025.

Nokia, Nokia Shanghai Bell, On Feeder Link Mobility in Transparent Satellite Payload Scenarios, 3GPP TSG RAN WG2 #113-e R2-2100528, Jan. 14, 2021.

Extended Supplementary European Search Report dated Nov. 5, 2025 received in European Application No. 23949926.2.

Japanese Notice of Reason for Rejection dated Nov. 7, 2025 received in Japanese Application No. 2025-514503.

3GPP TS 38.331 version 17.6.0 Release 17: "NR; Radio Resource Control (RRC); Protocol specification".

3GPP TS 38.304 version 17.6.0 Release 17: "NR; User Equipment (UE) procedures in Idle mode and RRC Inactive state".

3GPP TS 38.212 version 17.6.0 Release 17: "NR; Multiplexing and channel coding".

* cited by examiner

METHODS FOR BROADCASTING AND RECEIVING SYSTEM INFORMATION, APPARATUS, DEVICE AND STORAGE MEDIUM

TECHNICAL FIELD

The present application relates to the field of a satellite communication technology, in particular to a method for broadcasting system information, a method for receiving system information, an apparatus, a device and a storage medium.

BACKGROUND

In a 5G communication system, system information (SI) consists of a master information block (MIB) and a plurality of system information blocks (SIBs). There are a plurality of types of SIBs, a part of which are associated with neighbor cells, that is SIBs associated with the neighbor cells, including information associated with neighbor satellite ephemeris, measurement, and re-selection, such as an SIB2, an SIB3, an SIB4, an SIB5, and an SIB19. The content of the "SIBs associated with the neighbor cells" is information of one or more neighbor cells of a current serving cell, which is mainly used for mobility management. A user equipment performs detection and measurement on one or more neighbor cells through the SIBs associated with the neighbor cells, so as to be changed to a new cell before the coverage of the current serving cell ends. In this way, the user equipment may continuously camp on different cells in a mobile scenario to maintain service continuity.

In an existing 3rd generation partnership project (3GPP) standard protocol, the system information is periodically broadcasted in a unit of a cell, that is, under a coverage area of the entire cell, all user equipments at all positions receive the same system information. However, cells corresponding to a base station on a satellite have a wide coverage area, many beam footprints, and a small overlap range among the cells, and the broadcast of periodic cell-specific system information is not suitable for a satellite communication system, which will greatly increase the power consumption of sending a signal by a satellite antenna, occupy a radio link, and waste channel resources.

SUMMARY

Embodiments of the present application provide a method for broadcasting system information, a method for receiving the system information, an apparatus for broadcasting system information, a device and a storage medium, which may reduce the power consumption of sending a signal by a satellite antenna and save channel resources.

In a first aspect, the embodiments of the present application provide a method for broadcasting system information, applied to a base station on a satellite, including:

- determining an edge beam footprint corresponding to a first cell, where the first cell is a ground coverage region corresponding to the base station on the satellite, and the edge beam footprint is located at an edge position of the ground coverage region; and
- broadcasting system information associated with one or more neighbor cells of the first cell and system information associated with the first cell to the edge beam footprint in a process of broadcasting system information to the ground coverage region through a satellite beam.

In a possible implementation, the method further includes:

- broadcasting the system information associated with the first cell to a non-edge beam footprint corresponding to the first cell, and not broadcasting the system information associated with the one or more neighbor cells to the non-edge beam footprint, wherein the non-edge beam footprint is located at a non-edge position of the ground coverage region.

In the above embodiment, each cell includes one or more edge beam footprints and one or more non-edge beam footprints, the one or more edge beam footprints are located at the edge position of the cell, and the base station on the satellite broadcasts the system information of the one or more neighbor cells at the edge position of the cell, which may ensure that the user equipment located on an edge of the cell and having a cell re-selection or handover request may obtain the system information of the one or more neighbor cells in time; and the base station on the satellite broadcasts the system information of a local cell at the one or more non-edge beam footprints, which may provide a service for the user equipment located in the cell, and the above broadcasting mode not only reduces the power consumption of the satellite antenna, improves a utilization rate of satellite system resources, but also ensures the continuity of the service.

In a possible implementation, the system information associated with the one or more neighbor cells includes at least one of following information: system information block SIB2, SIB3, SIB4, SIB5, one or more NTN-specific parameters associated with the one or more neighbor cells in SIB19;

the system information associated with the first cell includes: the SIB19 including one or more NTN-specific parameters associated with the first cell, and system information unrelated to the one or more neighbor cells.

In the above embodiment, the SIB19 broadcast on the edge beam footprint includes the one or more NTN-specific parameters associated with the one or more neighbor cells, the SIB2-SIB5 are not broadcast on the non-edge beam footprint and the SIB19 broadcast on the non-edge beam footprint does not include the one or more NTN-specific parameters associated with the one or more neighbor cells. This setting of broadcasting different pieces of system information on different types of beam footprints may reduce the power consumption of the satellite antenna and save the channel resources.

In a possible implementation, broadcasting the system information associated with the one or more neighbor cells of the first cell to the edge beam footprint includes:

- sending indication information to the edge beam footprint, where the indication information is for a user equipment determining that the user equipment is located at the edge beam footprint, and indicating to the user equipment to update system information in a latest receiving occasion, and the indication information is carried in a short message.

In a possible implementation, the indication information includes modification information for the system information, and a modification of a broadcast control channel (BCCH) corresponding to the system information blocks SIB1, SIB2, SIB3, SIB4, SIB5 and SIB19 is indicated in a case that the modification information is 1.

In the above embodiment, the short message including the indication information is further sent at the edge beam footprint, so that the user equipment may determine that the user equipment itself is located at the edge beam footprint of the first cell, and then the user equipment may re-obtain the system information broadcasted by the base station on the satellite.

In a possible implementation, the system information associated with the one or more neighbor cells of the first cell includes at least one of the following:

system information associated with all neighbor cells of the first cell;

system information associated with part of all neighbor cells of the first cell; or system information associated with a first neighbor cell of the first cell.

In the above embodiment, one or more matched neighbor cells are preset for different edge beam footprints, so that an SIB associated with a neighbor cell matched with any edge beam footprint is broadcasted at the any edge beam footprint, rather than broadcasting the SIBs associated with all the neighbor cells, and this broadcasting mode may save the channel resources.

In a second aspect, the embodiments of the present application provide a method for receiving system information, applied to a user equipment, including:

moving, by the user equipment, to an edge beam footprint of a first cell, wherein the first cell is a ground coverage region corresponding to a base station on a satellite, and the edge beam footprint is located at an edge position of the ground coverage region; and receiving, at the edge beam footprint, system information associated with one or more neighbor cells of the first cell broadcasted by the base station on the satellite.

In the above embodiment, the user equipment updates the system information of the one or more neighbor cells at the edge beam footprint and receives the system information of a local cell at a non-edge beam footprint, and it is further ensured that the user equipment located at the edge beam footprint and having a cell re-selection or handover request may also obtain the system information of the one or more neighbor cells in time and accept a continuous service provided by a satellite system while a satellite operates with low power consumption and a high resource utilization rate.

In a possible implementation, after moving to the edge beam footprint of the first cell, the method further includes:

determining that the user equipment is located at the edge beam footprint.

In a possible implementation, the determining that the user equipment is located at the edge beam footprint includes:

receiving indication information sent by the base station on the satellite at the edge beam footprint, wherein the indication information is configured to indicate that the user equipment is located at the edge beam footprint, and the indication information is carried in a short message.

In a possible implementation, after the determining that the user equipment is located at the edge beam footprint, the method further includes:

updating system information in a latest receiving occasion.

In the above embodiment, the user equipment may trigger to, immediately after receiving the indication information, reobtain the system information broadcasted by the base station on the satellite, which ensures that the SIB associated with the neighbor cell can be obtained in time at the edge position of the cell, and cell re-selection or handover executed by the user equipment will not be affected.

In a possible implementation, the system information associated with the one or more neighbor cells includes at least one of the following:

system information associated with all neighbor cells of the first cell;

system information associated with part of all neighbor cells of the first cell; or system information associated with a first neighbor cell of the first cell.

In a possible implementation, the method further includes:

monitoring for a short message sent by the base station on the satellite in a paging occasion corresponding to the user equipment in a case that the user equipment is currently in an idle state or an inactive state; and monitoring for a short message sent by the base station on the satellite in any one paging occasion in a case that the user equipment is currently in a connected state.

In the above embodiment, different modes of monitoring for the short message are set for the user equipment in different states to ensure that the user equipment may receive the short message including the indication information in time in the different states.

In a third aspect, the embodiments of the present application provides an apparatus for broadcasting system information, applied to a base station on a satellite, including:

an edge beam footprint determining module, configured to determine an edge beam footprint corresponding to a first cell, where the first cell is a ground coverage region corresponding to the base station on the satellite, and the edge beam footprint is located at an edge position of the ground coverage region; and a broadcasting module, configured to broadcast system information associated with one or more neighbor cells of the first cell and system information associated with the first cell to the edge beam footprint in a process of broadcasting system information to the ground coverage region through a satellite beam.

In a fourth aspect, the embodiments of the present application provide an electronic device, including:

at least one processor; and a memory in communication connection with the at least one processor; wherein the memory stores an instruction able to be executed by the at least one processor, and the instruction is executed by the at least one processor to cause the at least one processor to execute the above method for the first aspect or execute the above method for the second aspect.

In a fifth aspect, the embodiments of the present application provide a user equipment, including:

at least one processor; and a memory in communication connection with the at least one processor; where the memory stores an instruction able to be executed by the at least one processor, and the instruction is executed by the at least one processor to cause the at least one processor to execute the above method for the second aspect.

In a sixth aspect, the embodiments of the present application provide a computer storage medium, where the computer storage medium stores a computer program, and the computer program is configured to enable a computer to execute the above method for the first aspect or execute the above method for the second aspect.

In a seventh aspect, an embodiment of the present application provides a computer program product, including a computer program, wherein the computer program, when being executed by a processor, implements the above method for the first aspect or the above method for the second aspect.

DETAILED DESCRIPTION

Figure 1:
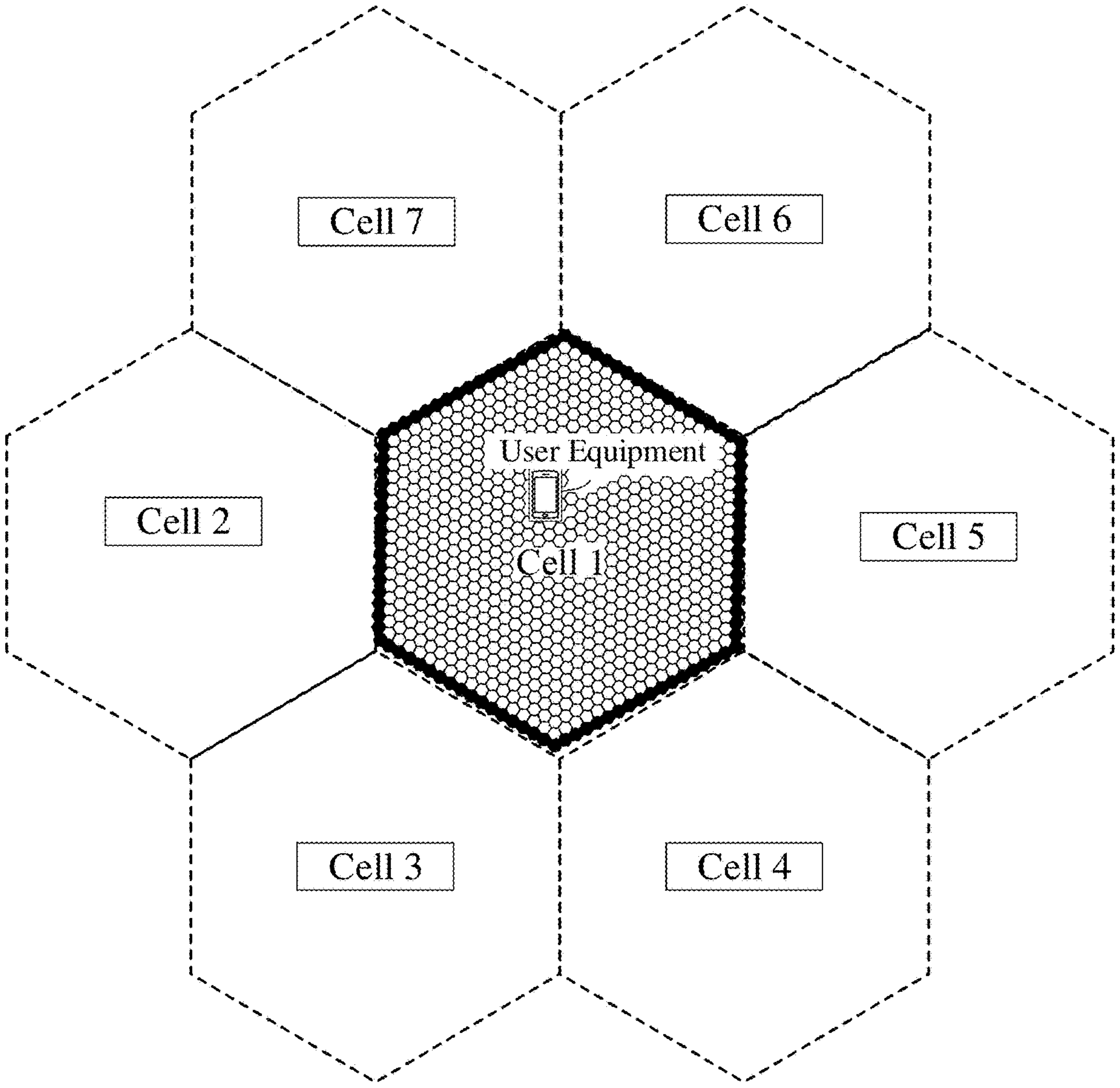
FIG. 1 is a schematic diagram of respective cells of a plurality of base stations on one or more satellites provided by an embodiment of the present application.

The principle and spirit of the present application will be described with reference to several exemplary implementations. It should be understood that these implementations are given merely to enable those skilled in the art to better understand and implement the present application, and do not limit the scope of the present application in any mode. Rather, these implementations are provided to make the present disclosure more thorough and complete, and to enable the scope of the present disclosure to be completely communicated to those skilled in the art.

Those skilled in the art know that the implementations of the present application may be implemented as a system, an apparatus, a method or a computer program product. Therefore, the present disclosure may be specifically implemented as the following forms: full hardware, full software (including firmware, resident software, microcode, etc.), or a combination of hardware and software.

In this article, it needs to be understood that the quantity of any elements in accompanying drawings is used for an example and not restriction, and any names are used for distinction only and do not have any restriction meaning.

Part of concepts involved in embodiments of the present application is introduced below.

System information: in a 5G communication system, the system information (SI) consists of an MIB and a plurality of SIBs. There are a plurality of types of SIBs, a part of which are associated with one or more neighbor cells, including information associated with neighbor satellite ephemeris, measurement, and re-selection, such as an SIB2, an SIB3, an SIB4, an SIB5, and an SIB19, called as "SIB associated with the one or more neighbor cells" in the embodiments of the present application. The content of the SIB associated with the one or more neighbor cells is system information of the one or more neighbor cells of a cell which a user equipment currently camps on, which is mainly used for mobility management. The user equipment performs detection and measurement on the one or more neighbor cells through the SIB associated with the one or more neighbor cells, so as to be changed to a neighbor cell before the coverage of the current serving cell ends. In this way, the user equipment may continuously camp on different cells in a mobile scenario to maintain service continuity.

The content of the SIB associated with the one or more neighbor cells can be as follows:

the SIB2: contains cell re-selection information, mainly related to the serving cell;

the SIB3: contains information about the serving frequency and intra-frequency neighbouring cells relevant for cell re-selection;

the SIB4: contains information about other radio (New Radio, NR) frequencies and inter-frequency neighbouring cells relevant for cell re-selection;

the SIB5: contains information about evolved universal terrestrial radio access (E-UTRA) neighbouring cells relevant for cell re-selection; and the SIB19: contains non-terrestrial network (NTN)-specific parameters for serving cell and optionally NTN-specific parameters for neighbour cells such as satellite ephemeris and a velocity. The SIB associated with the one or more neighbor cells mentioned in the present application refers to one or more NTN-specific parameters of one or more neighbor cells in the SIB19.

Beam footprint: a sub region in the ground coverage region corresponding to the base station on the satellite, as shown in FIG. 1, each "small grid" in a cell 1 indicates a beam footprint of the cell 1, and the satellite beam is used to broadcast the system information in a unit of the beam footprint.

Satellite beam: a beam sent to the ground coverage region through the satellite antenna.

Figure 2:
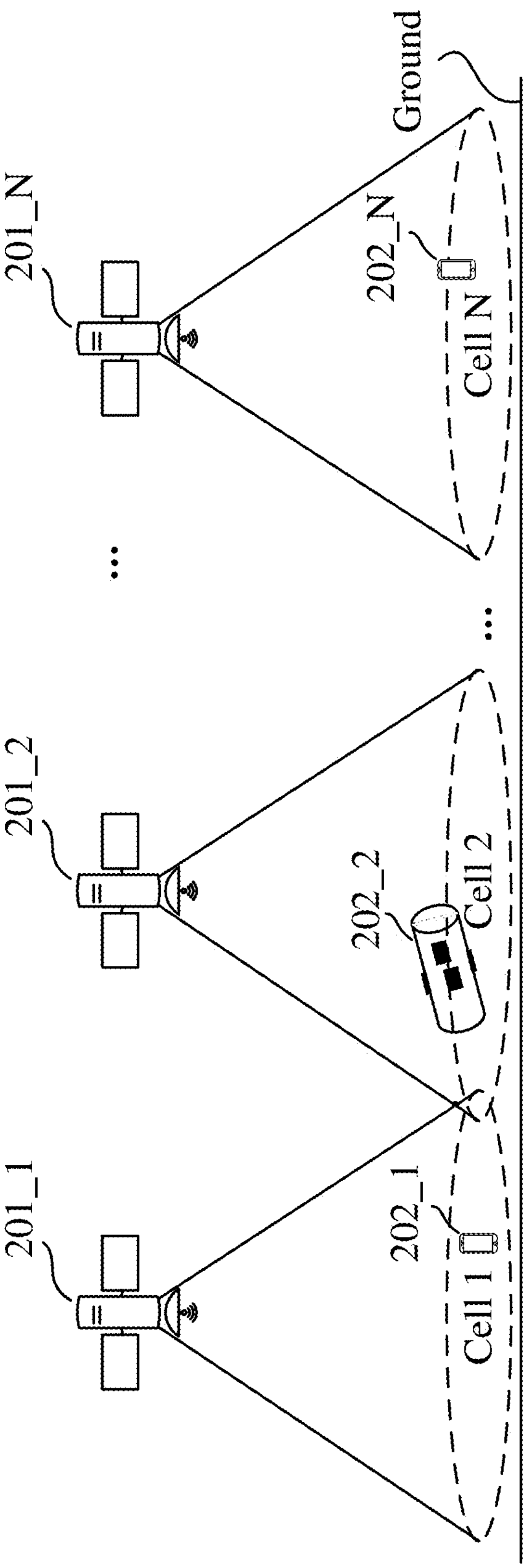
FIG. 2 is a schematic diagram of an application scenario of a method for broadcasting system information provided by an embodiment of the present application.

FIG. 2 shows an application scenario of a method for broadcasting system information provided by the embodiments of the present application, and the scenario includes at least one satellite (such as a satellite 201_1, a satellite 202_2 and a satellite 201_N shown in FIG. 2) and at least one user equipment (such as a user equipment 202_1, a user equipment 202_2 and a user equipment 202_N shown in FIG. 2). The satellite corresponds to the respective cell (the ground coverage region), that is, the satellite 201_1 corresponds to the cell 1, the satellite 202_2 corresponds to a cell 2, and the satellite 201_N corresponds to a cell N. The satellite may broadcast the system information to the user equipment located on the ground, so that the user equipment may obtain service resources provided by the satellite by using the system information, such as resources for positioning. A plurality of satellites with the same orbit, which may be either low orbit satellites or high orbit satellites. The user equipment may be a mobile phone or an aircraft. The embodiments of the present application do not specifically limit the type of the user equipment.

Figure 3:
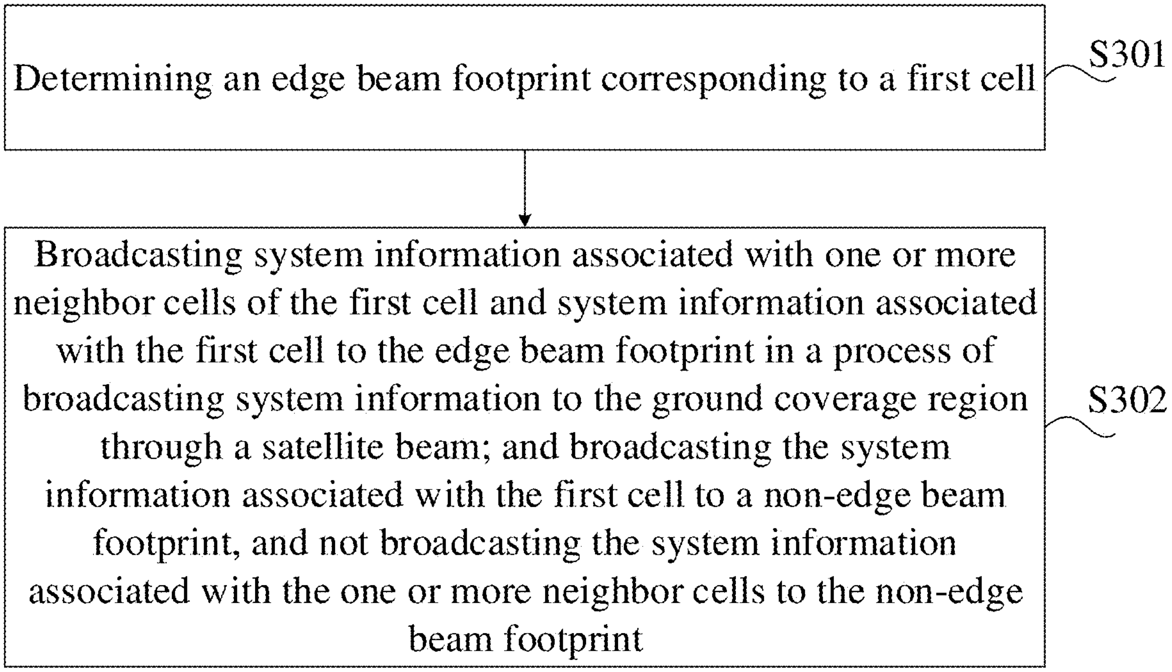
FIG. 3 is a schematic flow diagram of a method for broadcasting system information provided by an embodiment of the present application.

As shown in FIG. 1, the system information may be broadcasted in the whole coverage region of the cell 1, that is, the system information of one or more neighbor cells is broadcasted at each beam footprint in the cell. However, the user equipment is far away from the neighbor cell 2 to cell 7, so the user equipment has no need to replace the cell, and also cannot accept the service provided by the neighbor cells. At this time, if the SIBs associated with the neighbor cells are broadcasted in a region where the user equipment is located, it will cause waste of the channel resources. Based on this problem, an embodiment of the present application provides a method for broadcasting system information, applied to a base station on a satellite, a specific process is shown in FIG. 3, and the method includes following steps.

S301: determining an edge beam footprint corresponding to a first cell.

The first cell is a ground coverage region corresponding to a target base station on a satellite, that is, the cell which a user equipment currently camps on, also known as a local cell in the embodiments of the present application. The edge beam footprint is located at an edge position of the ground coverage region. As shown in FIG. 1, for the cell 1, the edge position is a "black part", that is, a "black grid" is the edge beam footprint of the cell 1. A shape of the cell may be a rectangle, a regular hexagon, a circle, etc., which is not specifically limited here. In addition, FIG. 1 shows that the neighbor cells of the cell 1 include the cell 2 to the cell 7.

Since, for different satellite systems, the sizes of the beam footprint are different, overlap ranges of the cells are different, paging cycles configured for the cells are different, and measuring capacities of user equipments are different, a width of a region formed by the edge positions of the cell may be one beam footprint, or a plurality of beam footprints, or different edge regions may be set for different cells of the same satellite system. For example, the width of a region formed by the edge positions of the cell 1 may be one beam footprint or two beam footprints, which may be formulated specifically according to needs of an actual system. That is, the number of the beam footprints for the width is defined as few as possible on the premise that it is ensured that the user equipment may have enough time to reobtain and update the system information, and perform the measurement before leaving the current serving cell at the edge of the cell, which is not specifically limited in the embodiments of the present application.

Figure 4:
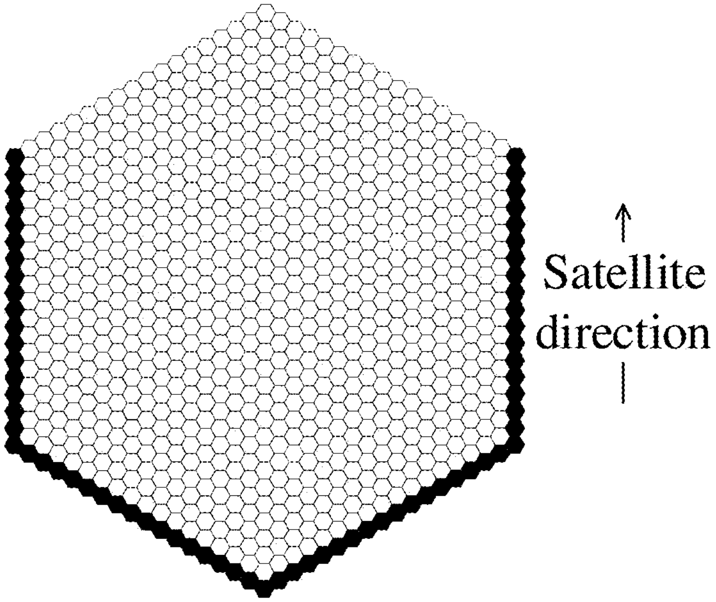
FIG. 4 is a schematic diagram of an edge beam footprint provided by an embodiment of the present application.

The method for broadcasting system information provided by the embodiments of the present application may be applied to a high orbit satellite system (synchronous satellite system) or a low orbit satellite system (non-synchronous satellite system). For the non-synchronous satellite, its velocity may be greater than a rotation speed of the earth, that is, a cell corresponding to the non-synchronous satellite is not at a fixed position, and there may be a situation where a movement speed of a cell is much higher than a movement speed of a user equipment, and in this case, the definition of the edge beam footprint may be further optimized as FIG. 4 (the black grid). In other words, the user equipment will not enter a neighbor region from a positive region (that is, an upper edge position) in a movement direction of the cell, so the system information associated with the one or more neighbor cells may also not be broadcasted in this region, and the system information associated with the local cell is only broadcasted.

S302: broadcasting system information associated with one or more neighbor cells of the first cell and system information associated with the first cell to the edge beam footprint in a process of broadcasting system information to the ground coverage region through a satellite beam; and broadcasting the system information associated with the first cell to a non-edge beam footprint, and not broadcasting the system information associated with the one or more neighbor cells to the non-edge beam footprint.

In the embodiments of the present application, for the cell corresponding to the base station on the satellite, a coverage range is wider, there are more beam footprints. In a case of sufficient antenna resources, one antenna (namely, the satellite beam) may be configured for each beam footprint in the cell to broadcast the system information, that is, the system information may be broadcasted to each beam footprint at the same time. However, in a case of insufficient antenna resources, the same antenna (namely, the satellite beam) may be configured for a plurality of beam footprints to broadcast the system information, and specifically, the corresponding system information may be broadcasted in turn on different beam footprints in a time-division mode. The embodiments of the present application do not specifically limit a broadcast sequence, but only ensures that the corresponding system information is broadcasted at the broadcast time corresponding to the beam footprint.

A specific implementation of broadcasting the system information by configuring one antenna for a plurality of beam footprints provided by the embodiments of the present application is as follows:

in a scenario where the user equipment receives the system information broadcasted by the base station on the satellite, the user equipment receives the system information once in the cell which the user equipment camps on currently, that is, the user equipment does not receive the system information repeatedly. If the base station on the satellite needs the user equipment to update the system information, an indication of updating the system information will be sent to the user equipment by sending a short message. In the embodiments of the present application, when the user equipment is located at the edge beam footprint of the first cell, it indicates that the user equipment may have the need to change the cell, and it needs to indicate the user equipment to update the system information at this time. According to a current 3rd generation partnership project (3GPP) protocol, the user equipment does not need to re-acquire the broadcasted system information when the user equipment moves from the inside of the first cell to the edge of the first cell. The embodiments of the present application propose an implementation that use a short message to indicate updating the system information when the user equipment enters the edge beam footprint, that is, the short message including indication information is sent to the edge beam footprint by using the satellite beam, the indication information being configured to indicate the user equipment to update the system information.

In an existing 3GPP, the base station may send the short message on a physical downlink control channel through downlink control information (DCI 1_0) scrambled by a paging radio network temporary identifier (P-RNTI). The short message has indication information with a plurality of bits for indicating different processes. For example, bit 1 may indicate the change of the system information, but the change of the system information defined by the 3GPP need to take effect within the next modification period, the modification period is configured through a modification period coefficient (modificationPeriodCoeff) and a default paging cycle (defaultPagingCycle) in the SIB1, and a configurable interval is 640 ms to 40.96 s. Since the moving speed of the non-synchronous satellite is fast, if the update is carried out until the next modification period, the user equipment may have left the edge region, and the system information may not be updated in time. Based on this, the embodiments of the present application extend the indication information in the short message, that is, any one of bit5 to bit8 is used as the indication information, and in the embodiments of the present application, the bit5 is selected as the indication information for indicating the user equipment to re-acquire the system information broadcasted by the base station on the satellite at a latest receiving occasion at the edge beam footprint, that is, the user equipment immediately updates the system information after receiving the system information. Because an existing technology requires that the system information can be updated until the next modification period, and for the broadcast of the system information at the edge beam footprint, the system information needs to be updated faster, the user equipment needs to update the system information immediately. The indicating bits extended by the embodiments of the present application are shown in Table 1.

TABLE 1

| Bit | Short Message |
|---|---|
| 1 | systemInfoModification<br>If set to 1: indication of a Broadcast Control Channel (BCCH) modification other than SIB6, SIB7 and SIB8. |
| 2 | etwsAndCmasIndication<br>If set to 1: indication of an Earthquake and Tsunami Warning System (ETWS) primary notification and/or an ETWS secondary notification and/or a Commercial Mobile Alert Service (CMAS) notification. |
| 3 | stopPagingMonitoring<br>This bit can be used for only operation with shared spectrum channel access and if nrof PDCCH-Monitoring OccasionPerSSB-InPO is present.<br>If set to 1: indication that the UE may stop monitoring PDCCH occasion(s) for paging in this Paging Occasion as specified in TS 38.304 [20], clause 7.1. |
| 4 | systemInfoModification-eDRX<br>If set to 1: indication of a BCCH modification other than SIB6, SIB7 and SIB8. This indication applies only to UEs using IDLE eDRX cycle longer than the BCCH modification period. |
| 5 | systemInfoModificationForMobility<br>If set to 1: indication of a BCCH modification of SIB1, SIB2, SIB3, SIB4, SIB5 and SIB19. That is, the user equipment is indicated to re-acquire system information of one or more neighbor cells broadcasted by the base station on the satellite on the edge beam footprint, and to update the system information. |
| 6-8 | Not used in this release of the specification, and shall be ignored by UE if received. |

The satellite beam uses the short message to indicate the user equipment to update the system information at the edge beam footprint in each paging time, that is, the satellite beam only sends the short message at the edge beam footprint, and the bit5 in the short message is 1 (indication information).

According to the method for broadcasting system information applied to the base station on the satellite provided by the embodiments of the present application, the one or more SIBs associated with the one or more neighbor cells are broadcasted on the edge region of the cell and the one or more SIBs associated with the local cell are broadcasted on the non-edge region, thus reducing the power consumption of sending a signal by the satellite and saving channel resources.

Based on the same inventive concept, the embodiments of the present application also provide a method for receiving system information, applied to a user equipment, including:

- the user equipment moves from a non-edge beam footprint of a first cell to an edge beam footprint of the first cell, and receives system information associated with one or more neighbor cells broadcasted by a base station on a satellite at the edge beam footprint.

The first cell is a ground coverage region corresponding to the base station on the satellite, and the base station on the satellite can use a satellite beam to broadcast the system information associated with the one or more neighbor cells to the edge beam footprint, and the edge beam footprint is located at an edge position of the ground coverage region. The specific steps for broadcasting the system information associated with the one or more neighbor cells to the edge beam footprint using the satellite beam are as described in the above S301 to S302, which is not repeated here.

If the user equipment moves from the non-edge beam footprint to the edge beam footprint, it indicates that the user equipment may enter a coverage range of a neighbor cell. In order to ensure the continuity of service, reselecting a cell in an idle state or an inactive state, or handovering the cell in a connected state may occur. Since the base station on the satellite will send a short message including indication information to the edge beam footprint, if the user equipment receives the short message, it is determined that the user equipment itself enters the edge beam footprint, and then the user equipment immediately triggers to perform the update of the system information after receiving the system information in a latest receiving occasion. For example, when the user equipment moves from the inside of the first cell to the edge region, the user equipment receives a short message with the bit5 as 1 on the user equipment side, and at this time, the user equipment immediately triggers to perform the update of the system information, that is, the system information associated with the one or more neighbor cells is used to update the system information, and then the updated system information is used to measure the one or more neighbor cells. If signal strength of a neighbor cell is greater than signal strength of the first cell, it indicates that the user equipment has a tendency to move to the neighbor cell, and the user equipment performs cell re-selection or handover. The embodiments of the present application do not specifically limit the condition of the cell re-selection or handover.

In a possible implementation, the user equipment in different states receives the short message in different ways, as described specifically in the following implementation.

(1) the User Equipment is in the Idle State or the Inactive State.

The user equipment monitors for short message(s) sent by the base station on the satellite through the satellite beam in a target paging occasion corresponding to the user equipment.

When the user equipment is in the idle state or the inactive state, it does not read the short message all the time. In order to obtain the short message in time, the user equipment reads the short message in the paging occasion (that is, the paging time of a discontinuous cycle) corresponding to the user equipment and determines whether the short message includes the indication information.

(2) the User Equipment is in a Connected State.

The user equipment monitors for the short message(s) sent by the base station on the satellite through the satellite beam in any one paging occasion.

If the user equipment is in the connected state, the user equipment shall select at least one paging occasion in each default paging cycle to monitor for the short message and judge whether the short message includes the indication information.

If the user equipment first enters the non-edge beam footprint (such as power on in the cell) and then enters the edge from the non-edge beam footprint, the user equipment will re-acquire complete system information including information of the one or more neighbor cells at the edge beam footprint through the indication information in the short message; if the user equipment first enters the edge beam footprint, and then moves from the edge beam footprint to the non-edge beam footprint, at this time, the user equipment will not update the system information, because the system information (that is, the system information associated with the one or more neighbor cells and the system information of the first cell) has been collected at the edge; and if the user equipment goes through: edge beam footprint→non-edge beam footprint→edge beam footprint, the user equipment receives the short message including the indication information several times, and does not need to receive system information of the one or more neighbor cells again if previously received information of one or more neighbor cells does not expire. In addition, if the user equipment repeatedly receives a short message of the bit5 as 1 in the same cell, and the information of the one or more neighbor cells does not expire, the user equipment can update the one or more SIBs associated with the one or more neighbor cells only once to save the power consumption of the user equipment.

According to a current 3GPP protocol specification, the user equipment cannot know whether the user equipment enters the edge region of the cell, and the user equipment will not re-receive the system information when the beam footprint where the user equipment is located is changed in the same cell. The embodiments of the present application propose a scheme of indicating the user equipment to update the system information immediately by extending the short message, which ensures that the user equipment can update the one or more SIBs associated with the one or more neighbor cells in time at the edge of the cell.

Figure 5:
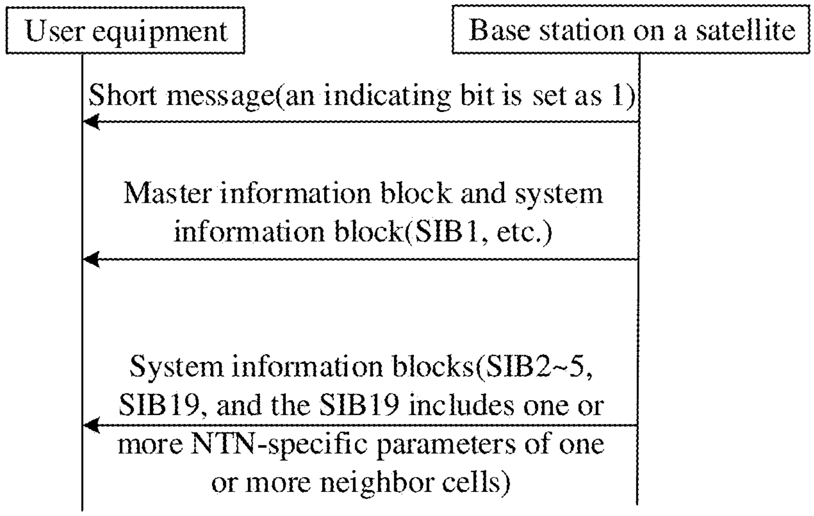
FIG. 5 is a schematic diagram of the broadcasting process from a base station on a satellite to a user equipment provided by an embodiment of the present application.

A specific process that the base station on the satellite broadcasts information to the user equipment will be illustrated in detail through FIG. 5 below.

Figure 6:
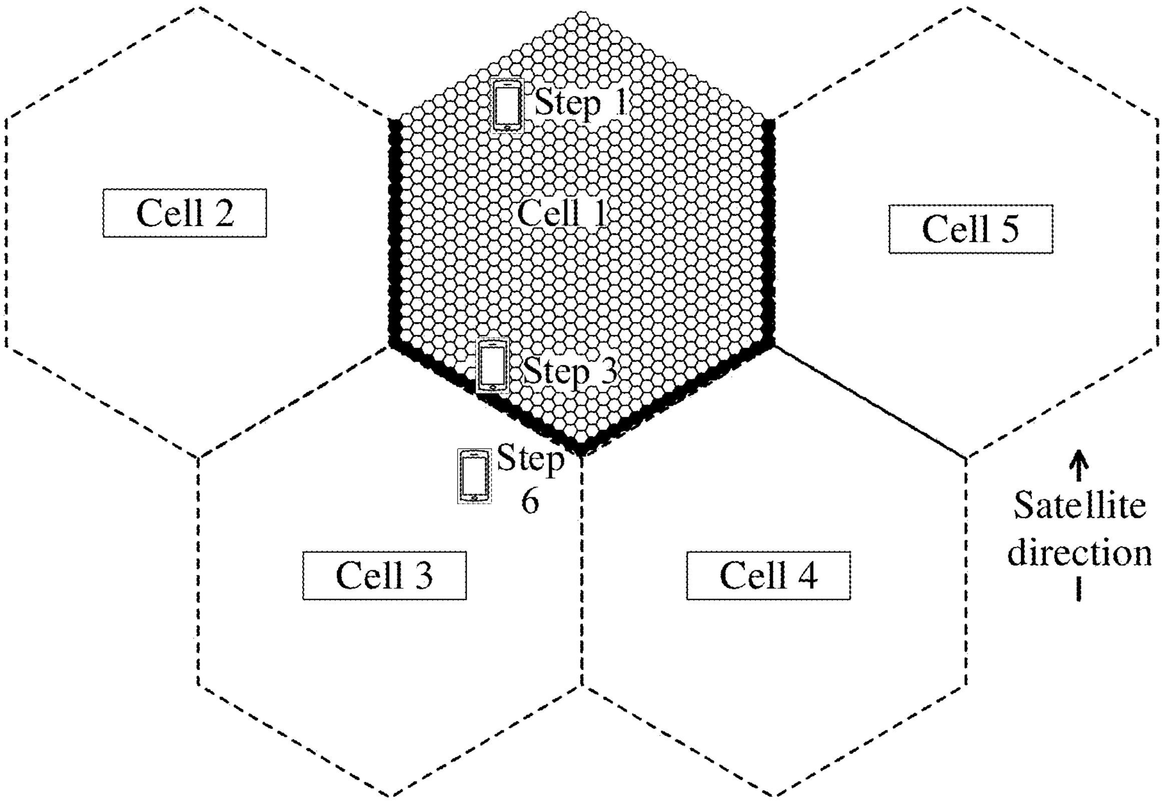
FIG. 6 is a schematic diagram of receiving broadcasted information by a user equipment in a first cell provided by an embodiment of the present application.

Step 1, as shown in FIG. 6, the user equipment is inside the cell 1 (including a scenario where the user equipment camps on the cell 1 in various forms such as cell selection or re-selection, handover or redirection).

Step 2, the user equipment receives broadcasted information at the non-edge beam footprint. The system information sent by the base station on the satellite includes an MIB and an SIB1, the scheduling information (si-SchedulingInfo) of the system information in the SIB1 only indicates the scheduling of an SIB19, and the moving speed of the cell corresponding to the satellite is higher than that of the user equipment.

An example of the si-SchedulingInfo of the SIB1 is as follows:

extended scheduling information of the system information (SI-SchedulingInfo-v1700)
scheduling information list 2 (schedulingInfoList2-r17)
item 0 (Item-0)
scheduling Information 2 (SchedulingInfo2-r17)
the broadcast status of the system information is broadcasting (si-BroadcastStatus-r17=broadcasting)
the broadcast period of the system information is 64 frames (si-Periodicity-r17=rf64)
mapping information of the system information block (sib-MappingInfo-r17)
item 0 (Item-0)
extended type information of the system information block (SIB-TypeInfo-v1700)
the type is sib19 (type1-r17=sibType19)
the value tag is 0 (valueTag-r17=0)
the SIB19 includes one or more NTN-specific parameters (ntn-Config-r17) associated with the first cell, but does not include one or more NTN-specific parameters (ntn-NeighCellConfigList-r17) associated with the one or more neighbor cells.

Step 3, as the satellite moves or the user equipment moves, the user equipment begins to enter the edge (i.e., the black region) of the cell 1.

Step 4, the base station on the satellite continuously sends the short message including the indication information at the edge beam footprint of the cell, and the bit5 (systemInfo-ModificationForMobility) extended in the embodiments of the present application is set as 1. System information of a cell 3 broadcasted by the base station on the satellite on the edge region includes an MIB and an SIB1.

Here, scheduling information (si-SchedulingInfo) of the system information in the SIB1 schedules SIB2-SIB5 and the SIB19, and an example is as follows:

scheduling information of the system information (si-SchedulingInfo)
scheduling information list (schedulingInfoList)
item 0 (Item-0)
scheduling information (SchedulingInfo)
the broadcast status of the system information is broadcasting (si-BroadcastStatus=broadcasting)
the broadcast period of the system information is 32 frames (si-Periodicity=rf32)
mapping information of the system information block (sib-MappingInfo)
item 0 (Item-0)
the type of system information block (SIB-TypeInfo)
the type is sib2 (type=sibType2)
the value tag is 0 (valueTag=0)
item 1 (Item-1)
scheduling Information (SchedulingInfo)
the broadcast status of the system information is broadcasting (si-BroadcastStatus=broadcasting)
the broadcast period of the system information is 64 frames (si-Periodicity=rf64)
mapping information of the system information block (sib-MappingInfo)
item 0 (Item-0)
the type of system information block (SIB-TypeInfo)
the type is sib3 (type=sibType3)
the value tag is 0 (valueTag=0)
item 2 (Item-2)
scheduling information (SchedulingInfo)
the broadcast status of the system information is broadcasting (si-BroadcastStatus=broadcasting)
the broadcast period of the system information is 64 frames (si-Periodicity=rf64)
mapping information of the system information block (sib-MappingInfo)

item 0 (Item-0)

the type of system information block (SIB-TypeInfo)

the type is sib4 (type=sibType4)

the value tag is 0 (valueTag=0)

item 3 (Item-3)

scheduling information (SchedulingInfo)

the broadcast status of the system information is broadcasting (si-BroadcastStatus=broadcasting)

the broadcast period of the system information is 64 frames (si-Periodicity=rf64)

mapping information of the system information block (sib-MappingInfo)

item 0 (Item-0)

the type of system information block (SIB-TypeInfo)

the type is sib5 (type=sibType5)

the value tag is 0 (valueTag=0)

scheduling information of system information in the 1700th version (SI-SchedulingInfo-v1700)

scheduling Information list 2 (schedulingInfoList2-r17)

item 0 (Item-0)

scheduling Information 2 (SchedulingInfo2-r17)

the broadcast status of the system information is broadcasting (si-BroadcastStatus-r17=broadcasting)

the broadcast period of the system information is 64 frames (si-Periodicity-r17=rf64)

mapping information of the system information block (sib-MappingInfo-r17)

item 0 (Item-0)

extended type information of the system information block (SIB-TypeInfo-v1700)

the type is sib19 (type1-r17=sibType19)

the value tag is 1 (valueTag-r17=1)

The SIB19 includes one or more NTN-specific parameters associated with the first cell and one or more NTN-specific parameters associated with the one or more neighbor cells.

Step 5, after receiving the short message including the indication information, the user equipment uses the received system information of the cell 3 to update the system information immediately, and obtains a measurement configuration of the cell 3 and an ephemeris configuration of the base station on the satellite corresponding to the cell 3.

Step 6: the user equipment performs a measurement, re-selection or handover based on the 3GPP protocol, and the cell 1 is changed to the cell 3.

Figure 7:
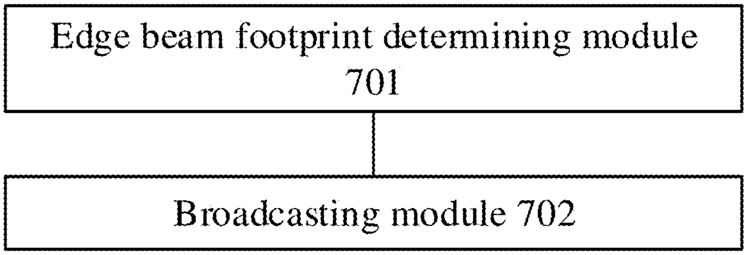
FIG. 7 is a schematic diagram of an apparatus for broadcasting system information provided by an embodiment of the present application.

Based on the same inventive concept, the embodiments of the present application further provide an apparatus for broadcasting system information, applied to a base station on a satellite, and as shown in FIG. 7, the apparatus includes:

an edge beam footprint determining module 701, configured to determine an edge beam footprint corresponding to a first cell, where the first cell is a ground coverage region corresponding to the base station on the satellite, and the edge beam footprint is located at an edge position of the ground coverage region; and a broadcasting module 702, configured to broadcast system information associated with one or more neighbor cells of the first cell and system information associated with the first cell to the edge beam footprint in a process of broadcasting system information to the ground coverage region through a satellite beam.

In a possible implementation, the broadcasting module 702 is configured to:

broadcast the system information associated with the first cell to a non-edge beam footprint corresponding to the first cell, and not broadcast the system information associated with the one or more neighbor cells to the non-edge beam footprint, where the non-edge beam footprint is located at a non-edge position of the ground coverage region.

In a possible implementation, the broadcasting module 702 is configured to broadcast system information blocks SIB2, SIB3, SIB4, SIB5, and one or more NTN-specific parameters associated with the one or more neighbor cells in SIB19; and broadcast the SIB19 including the one or more NTN-specific parameters associated with the first cell, and system information unrelated to the one or more neighbor cells.

In a possible implementation, the broadcasting module 702 is configured to:

send indication information to the edge beam footprint, where the indication information is configured to make a user equipment determined to be located at the edge beam footprint, and indicate the user equipment to update the system information in a latest receiving occasion, and the indication information is carried in a short message; and the indication information includes modification information for the system information, and a modification of a broadcast control channel (BCCH) corresponding to the system information blocks SIB1, SIB2, SIB3, SIB4, SIB5 and SIB19 is indicated in a case that the modification information is 1.

In a possible implementation, the broadcasting module 702 is configured to determine the system information associated with the one or more neighbor cells, and the system information includes at least one of the following:

system information associated with all neighbor cells of the first cell;

system information associated with part of all neighbor cells of the first cell; or system information associated with a first neighbor cell of the first cell.

Based on the same inventive concept, the embodiments of the present application further provide a user equipment, including:

at least one processor; and a memory in communication connection with the at least one processor; where the memory stores an instruction able to be executed by the at least one processor, and the instruction is executed by the at least one processor so as to cause the at least one processor to execute the method for receiving system information applied to the user equipment in the above embodiments.

Figure 8:
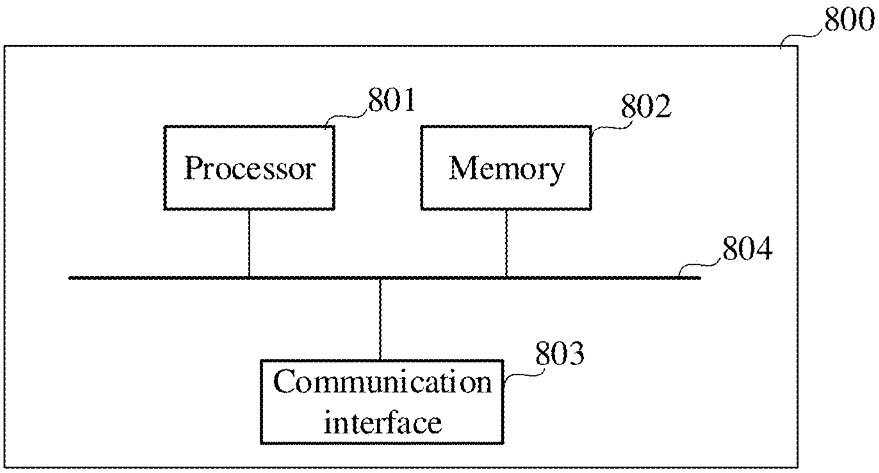
FIG. 8 is a schematic diagram of a user equipment provided by an embodiment of the present application.

As shown in FIG. 8, the user equipment 800 includes a processor 801, a memory 802 and a communication interface 803. The processor 801, the memory 802 and the communication interface 803 are connected with one another through a bus 804.

The processor 801 is configured to read an instruction in the memory 802 and executes the instruction, so as to enable the at least one processor to be able to execute the method for receiving system information applied to the user equipment provided by the above embodiments.

The memory 802 is configured to store various instructions and programs of the method for receiving system information applied to the user equipment provided by the above embodiments.

Based on the same inventive concept, the embodiments of the present application further provide an electronic device, including:

at least one processor; and a memory in communication connection with the at least one processor; where the memory stores an instruction able to be executed by the at least one processor, and the instruction is executed by the at least one processor so as to cause the at least one processor to execute the method for broadcasting system information applied to the base station on the satellite in the above embodiments.

Figure 9:
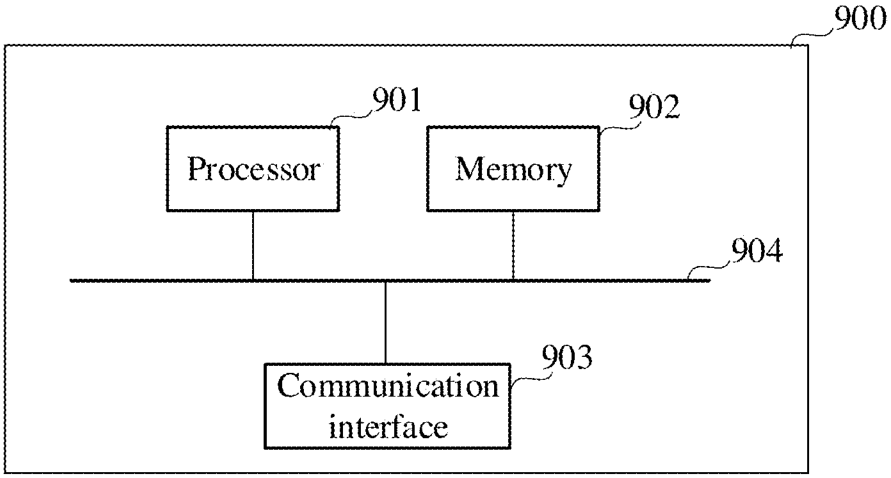
FIG. 9 is a schematic diagram of an electronic device provided by an embodiment of the present application.

As shown in FIG. 9, the electronic device 900 includes a processor 901, a memory 902 and a communication interface 903. The processor 901, the memory 902 and the communication interface 903 are connected with one another through a bus 904.

The processor 901 is configured to read an instruction in the memory 902 and executes the instruction, so as to enable the at least one processor to be able to execute the method for broadcasting system information applied to the base station on the satellite or the method for receiving system information applied to the user equipment provided by the above embodiments.

The memory 902 is configured to store various instructions and programs of the method for broadcasting system information applied to the base station on the satellite or the method for receiving system information applied to the user equipment provided by the above embodiments.

The buses 804 and 904 may be peripheral component interconnect (PCI for short) buses or extended industry standard architecture (EISA for short) buses, etc. The buses may be divided into address buses, data buses, control buses and so on. For convenience of showing, only one thick line is used for showing the buses in FIG. 8 and FIG. 9, but it does not mean that there is only one bus or one type of buses.

The processors 801 and 901 may be a central processing unit (CPU for short), a network processor (NP for short), a graphic processing unit (GPU for short), or any combination of the CPU, the NP, or the GPU. The processor may also be a hardware chip. The hardware chip may be an application-specific integrated circuit (ASIC for short), a programmable logic device (PLD for short), or a combination thereof. The above PLD may be a complex programmable logic device (CPLD for short), a field-programmable gate array (FPGA for short), a generic array logic (GAL for short) or any combination thereof.

The embodiments of the present application further provide a computer program product, including a computer program that implements any above method for broadcasting system information or any above method for receiving system information when the computer program is executed by a processor. For example, the methods in the present application may be implemented in whole or in part by software, hardware, firmware, or any combination thereof. When being implemented by using software, the methods may be implemented in whole or in part in a form of the computer program product. The computer program product includes one or more computer programs or instructions. When the computer programs or instructions are loaded and executed on a computer, a process or function of the present application is performed in whole or in part. The computer may be a general purpose computer, a special purpose computer, a computer network, a network device, a user device, a core network device, an OAM, or other programmable apparatuses.

Optionally, a computer readable storage medium may be used as an implementation mode of the computer program product, that is, the embodiments of the present application further provide a computer readable storage medium including a computer program, and the computer program, when executed by a processor, implements any above method for broadcasting system information or any above method for receiving system information.

For example, the computer program or instruction may be stored in the computer readable storage medium or transmitted from one computer readable storage medium to another computer readable storage medium, for example, the computer program or instruction may be transmitted from one website, computer, server or data center to another website, computer, server or data center in a wired or wireless mode. The computer readable storage medium may be any available medium that the computer can access or a data storage device such as the server or the data center that integrates one or more available media. The available media may be magnetic media, for example, a floppy disk, a hard disk and a magnetic tape, may also be an optical medium, for example, a digital video compact disk and may further be a semiconductor medium, for example, a solid state drive. The computer readable storage medium may be a volatile or non-volatile storage medium, or may include both volatile and non-volatile storage media.

Those skilled in the art shall understand that the embodiments of the present application may be provided as a method, a system, or a computer program product. Therefore, the present application may take a form of a full hardware embodiment, a full software embodiment, or a combination of software and hardware. Further, the present application may take a form of a computer program product implemented on one or more computer available storage media (including but not limited to a disk memory, a CD-ROM, an optical memory, etc.) in which computer available program codes are included.

The present application is described by reference to a flow diagram and/or block diagram of the method, the device (system), and the computer program product pursuant of the present application. It shall be understood that each flow and/or block in the flow diagram and/or block diagram, and a combination of the flows and/or the blocks in a flow diagram and/or block diagram may be implemented by the computer program instructions. These computer program instructions may be supplied to a processor of the general purpose computer, the special purpose computer, an embedded processor, or other programmable data processing devices to produce a machine, so that the instructions executed by the processor of the computer or other programmable data processing devices produce an apparatus used to implement a function specified in one or more flows of the flow diagram and/or one or more blocks of the block diagram.

These computer program instructions may also be stored in a computer readable memory able to guide a computer or other programmable data processing devices to work in a particular mode, such that the instructions stored in the computer readable memory produce manufactured goods including an instruction apparatus, and the instruction apparatus implements a function specified in one or more flows of the flow diagram and/or one or more blocks of the block diagram.

These computer program instructions may also be loaded onto the computer or other programmable data processing devices, such that a series of operational steps are performed on the computer or other programmable data processing devices to produce computer-implemented processing, and therefore the instructions executed on the computer or other programmable devices provide steps used for implementing the function specified in one or more flows of the flow diagram and/or one or more blocks of the block diagram. Obviously, those skilled in the art may make various modifications and variations on the present application without departing from the spirit and scope of the present application. Thus, if these modifications and variations of the present application fall within the scope of the claims of the present application and their equivalents, the present application is also intended to include such modifications and variations.

The invention claimed is:

1. A method for broadcasting system information, applied to a base station on a satellite, comprising:

determining an edge beam footprint of a first cell, wherein the first cell is a ground coverage region corresponding to the base station on the satellite, and includes an edge beam footprint and a non-edge beam footprint, and each of the edge beam footprint and the non-edge beam footprint corresponds to a respective beam footprint of a respective satellite beam sent to the ground coverage region through an antenna of the satellite, and wherein the edge beam footprint is located at an edge position of the ground coverage region, and the edge beam footprint is distinguished from the non-edge beam footprint that is not located at the edge position of the ground coverage region; and broadcasting at least system information associated with one or more neighbor cells of the first cell to the edge beam footprint of the first cell in a unit of the respective beam footprint of the respective satellite beam, and not broadcasting the system information associated with the one or more neighbor cells of the first cell to the non-edge beam footprint, wherein the system information associated with the one or more neighbor cells indicates to a user equipment to update the system information in a latest receiving occasion.

2. The method according to claim 1, further comprising:

broadcasting the system information associated with the first cell to the non-edge beam footprint of the first cell.

3. The method according to claim 1, wherein the system information associated with the one or more neighbor cells comprises at least one of following information: system information block SIB2, SIB3, SIB4, SIB5, and one or more NTN-specific parameters associated with the one or more neighbor cells in SIB19, and wherein the system information associated with the first cell comprises: the SIB19 comprising one or more NTN-specific parameters associated with the first cell, and system information unrelated to the one or more neighbor cells.

4. The method according to claim 1, wherein the system information associated with the one or more neighbor cells comprises modification information for system information, and a modification of a broadcast control channel (BCCH) corresponding to system information blocks SIB1, SIB2, SIB3, SIB4, SIB5 and SIB19 is indicated in a case that the modification information for the system information is 1.

5. The method according to claim 1, wherein the system information associated with the one or more neighbor cells is carried in a short message.

6. The method according to claim 1, wherein the system information associated with the one or more neighbor cells of the first cell further comprises:

system information associated with all neighbor cells of the first cell.

7. The method according to claim 1, wherein the system information associated with the one or more neighbor cells of the first cell comprises:

system information associated with part of all neighbor cells of the first cell.

8. The method according to claim 1, wherein the system information associated with the one or more neighbor cells of the first cell comprises:

system information associated with a first neighbor cell of the first cell.

9. A method for receiving system information, applied to a user equipment, as the user equipment moves from a non-edge beam footprint of a first cell to an edge beam footprint of the first cell, wherein the first cell is a ground coverage region corresponding to a base station on a satellite, and each of the edge beam footprint and the non-edge beam footprint corresponds to a respective beam footprint of a respective satellite beam sent to the ground coverage region through an antenna of the satellite, and wherein the edge beam footprint is located at an edge position of the ground coverage region, and the edge beam footprint is distinguished from the non-edge beam footprint that is not located at the edge position of the ground coverage region, the method comprising:

receiving at least system information associated with one or more neighbor cells of the first cell at the edge beam footprint of the first cell in a unit of the respective beam footprint of the respective satellite beam, and not receiving the system information associated with the one or more neighbor cells of the first cell at the non-edge beam footprint; and determining, according to the system information associated with the one or more neighbor cells, to update the system information in a latest receiving occasion.

10. The method according to claim 9, after the determining, according to the system information associated with the one or more neighbor cells, to update the system information in the latest receiving occasion, further comprising: updating the system information in the latest receiving occasion.

11. The method according to claim 9, wherein the system information associated with the one or more neighbor cells further comprises at least one of the following:

system information associated with all neighbor cells of the first cell;

system information associated with part of all neighbor cells of the first cell; or system information associated with a first neighbor cell of the first cell.

12. The method according to claim 9, further comprising:

monitoring for a short message sent by the base station on the satellite in a paging occasion corresponding to the user equipment in a case that the user equipment is currently in an idle state or an inactive state; and monitoring for a short message sent by the base station on the satellite in any paging occasion in a case that the user equipment is currently in a connected state.

13. A user equipment comprising:

at least one processor; and a memory in communication connection with the at least one processor, wherein the memory stores an instruction executable by the at least one processor to cause the at least one processor to execute following steps, as the user equipment moves from a non-edge beam footprint of a first cell to an edge beam footprint of the first cell, wherein the first cell is a ground coverage region corresponding to a base station on a satellite, and each of the edge beam footprint and the non-edge beam footprint corresponds to a respective beam footprint of a respective satellite beam sent to the ground coverage region through an antenna of the satellite, and wherein the edge beam footprint is located at an edge position of the ground coverage region, and the edge beam footprint is distinguished from the non-edge beam footprint that is not located at the edge position of the ground coverage region:

receiving at least system information associated with one or more neighbor cells of the first cell at the edge beam footprint of the first cell in a unit of the respective beam footprint of the respective satellite beam, and not receiving the system information associated with the one or more neighbor cells of the first cell at the non-edge beam footprint; and determining, according to the system information associated with the one or more neighbor cells, to update the system information in a latest receiving occasion.

14. An electronic device comprising:

at least one processor; and a memory in communication connection with the at least one processor, wherein the memory stores an instruction executable by the at least one processor to cause the at least one processor to execute following steps:

determining an edge beam footprint of a first cell, wherein the first cell is a ground coverage region corresponding to a base station on a satellite, and includes an edge beam footprint and a non-edge beam footprint, and each of the edge beam footprint and the non-edge beam footprint corresponds to a respective beam footprint of a respective satellite beam sent to the ground coverage region through an antenna of the satellite, and wherein the edge beam footprint is located at an edge position of the ground coverage region, and the edge beam footprint is distinguished from the non-edge beam footprint that is not located at the edge position of the ground coverage region; and broadcasting at least system information associated with one or more neighbor cells of the first cell to the edge beam footprint of the first cell in a unit of the respective beam footprint of the respective satellite beam, and not broadcasting the system information associated with the one or more neighbor cells of the first cell to the non-edge beam footprint of the first cell, in a process of broadcasting the system information to the ground coverage region through a satellite beam, wherein the satellite beam is configured for broadcasting system information associated with one or more beam footprints of the first cell, wherein the system information associated with the one or more neighbor cells indicates to a user equipment to update the system information in a latest receiving occasion.

* * * * *